Figure 1:
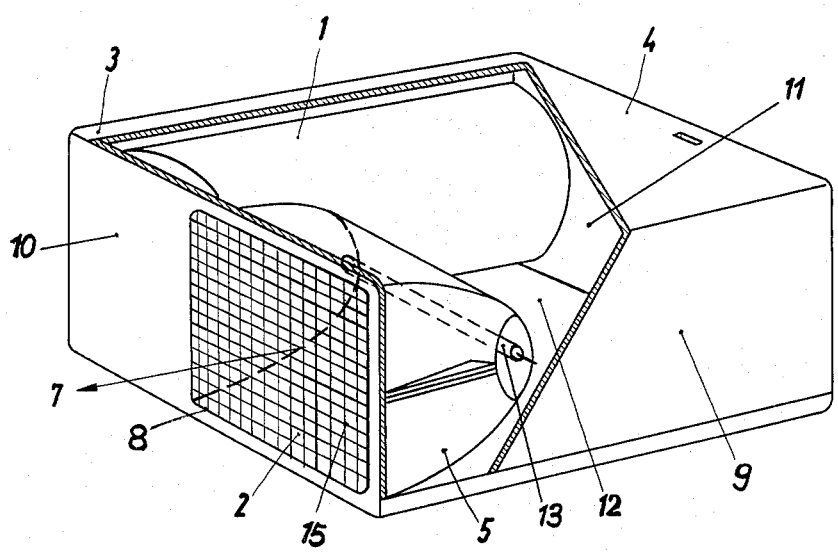

Aug. 31, 1965     W. SCHMIDT     3,204,089
ELECTRONIC FLASH UNIT
Filed Oct. 22, 1962

Inventor:

3,204,089
ELECTRONIC FLASH UNIT
Walter Schmidt, Berlin-Lichterfelde, Germany, assignor to Loewe Opta A.G., Berlin, Germany, a company of Germany
Filed Oct. 22, 1962, Ser. No. 232,923
Claims priority, application Germany, Oct. 26, 1961, L 30,583, Reg. No. (utility model) 1,845,695
1 Claim. (Cl. 240—1.3)

Subject of the invention is an electronic flash unit consisting of a single, shallow, cuboid case attachable to a camera and containing all requisite electrical control elements for an electronic flash unit.

In such an electronic flash unit, therefore, all electrical components and control elements such as D.C. transformer, storage condenser, reflector with flash lamp and switch and any loading device are to be accommodated in a single cuboid case. Difficulties arise in the spatial accommodation of these elements, as the dimensions of the case must of course be kept to a minimum. Of particular importance here is the position of the largest and heaviest control element, the storage condenser. The aim of the invention is to position the storage condenser inside the case so as to create the greatest possible space behind the reflector, which enables all electrical elements finally connected with the flash lamp in the reflector to be accommodated without difficulty.

The single-part electronic flash unit in accordance with the invention is characterized by the storage condenser being disposed with its longitudinal axis parallel to the direction of the issue of light from the reflector and laterally beside the reflector, preferably contiguously with one of the two side walls. As a result of this arrangement the entire portion of the case behind the reflector is left free for the remaining electrical control elements (i.e., excepting the storage condenser). There is thus available for these control elements a maximum of continuous space without any spaces branching off laterally.

Further, the holder by which the unit is attached to the camera being positioned outside the symmetrical axis, the storage condenser shall in accordance with the invention lie at the same side as the holder, which shifts the centre of gravity of the unit towards the holder. This shift of the centre of gravity towards the holder enables the camera bearing the electronic flash unit to be handled better.

Further details of the invention are shown in the exemplary design given in the drawing.

Figure 2:
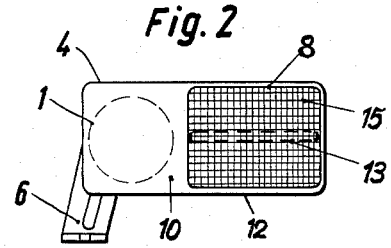

FIG. 1 shows a perspective view of the electronic flash unit in accordance with the invention, wherein the top wall and one side wall are partially cut away, and FIG. 2 shows a front view of the electronic flash unit with the holder turned out.

As FIG. 1 shows, the storage condenser 1 of elongated cylindrical form is disposed laterally beside the reflector 5 with its longitudinal axis parallel to the side walls 3 and 9 and adjacent the side wall 3 of the cuboid flash unit case having a front wall 10 and a rear wall 11. The top and bottom walls of this case are 4 and 12, respectively. The flash lamp 13 is mounted within a concave reflector 5, the opening 2 of which is mounted on the front wall 10 in registry with the front wall opening 8. This opening 8 is covered by a plate 15 illustrated by a lattice hatching and consisting of a material permeable for the flash light rays emanating from the flash lamp 13 into the direction indicated by the arrow 7. As in FIG. 1 the top wall 4 and the side wall 9 are partially cut away it can be clearly seen that the entire free space behind the reflector 5 is available for the remaining control elements without there being any spaces branching off laterally.

FIG. 2, which represents a front view of the electronic flash unit in a reduced scale, clearly shows the position of the storage condenser 1, marked by broken lines, in relation to the holder 6. In accordance with the invention the storage condenser 1 shall lie at that side of the case where the holder 6 for attaching the electronic flash unit case 4 to the camera is fitted. This shifts the centre of gravity towards the holder, which provides for better handling of the camera with the electronic flash unit attached.

What I claim is:

An electronic flash unit comprising a cuboid hollow case having front and rear walls, top and bottom walls, and side walls; the height of said case being substantially less than the width and length thereof; an opening in the front wall of said case adjacent one side thereof; a concave reflector having its open end mounted on said front wall within said case in registry with said front wall opening; an electronic flash lamp mounted within said reflector for emitting a flash of light through said front wall opening; an elongated cylindrical storage condenser being mounted intermediate said reflector and the opposite side wall of said case with the longitudinal axis of said condenser parallel to said side walls; said storage condenser being mounted adjacent said opposite side wall and extending from the front wall to the rear wall of said case; and means for mounting said electronic flash unit to a camera being fixed to said case at said opposite side wall adjacent said condenser.

References Cited by the Examiner

UNITED STATES PATENTS

| | | | |
|---|---|---|---|
| 682,742 | 9/01 | Plass | 240—10.65 X |
| 2,624,831 | 1/53 | Farber | 240—1.3 |
| 3,018,707 | 1/62 | Whittier | 240—1.3 X |
| 3,049,611 | 8/62 | Kluge | 240—1.3 |
| 3,077,534 | 2/63 | Brandt | 95—11.5 X |
| 3,113,495 | 12/63 | Brandt et al. | 240—1.3 X |

NORTON ANSHER, *Primary Examiner.*